Figure 1:
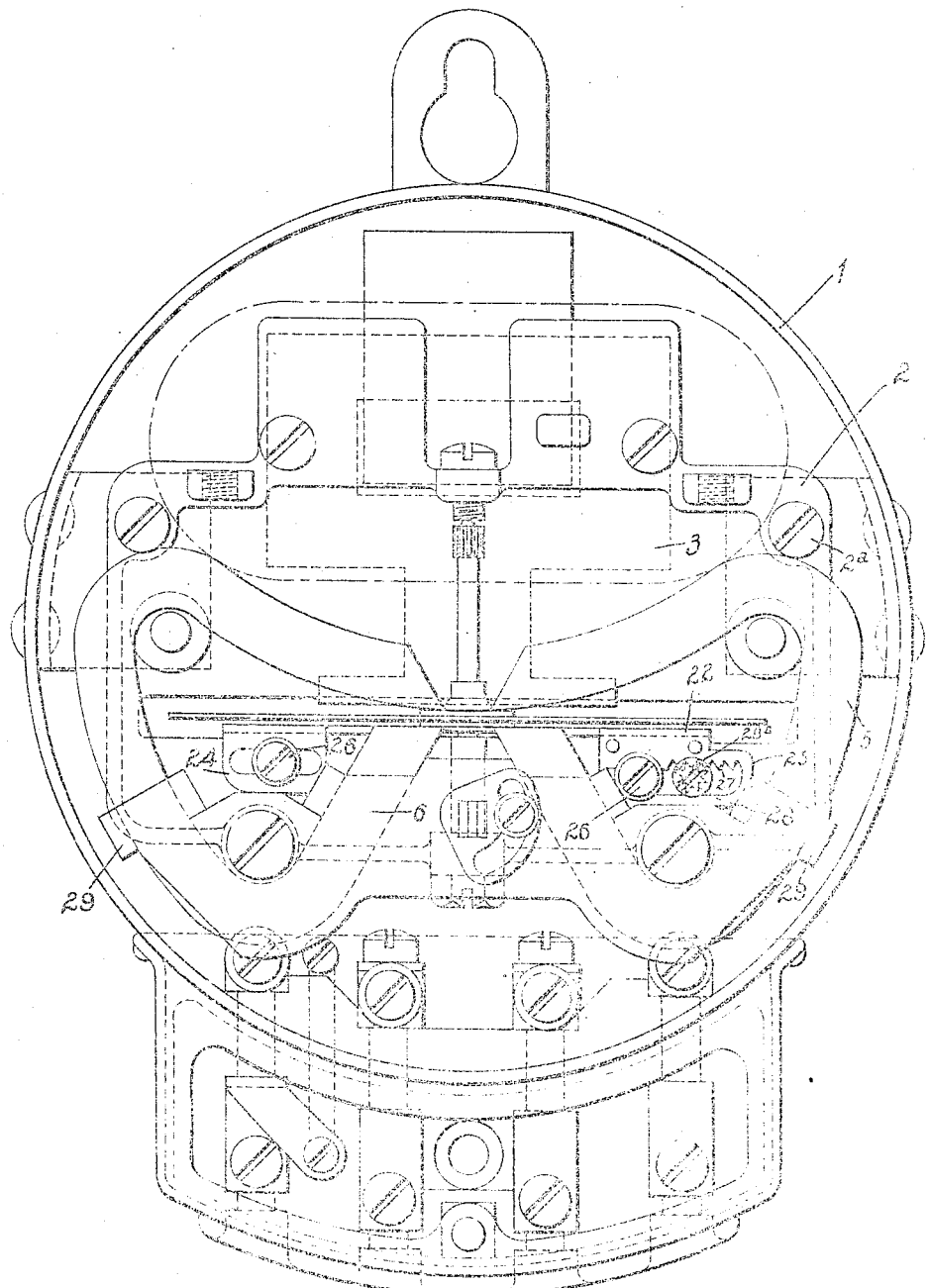

C. A. BODDIE & W. M. BRADSHAW
ELECTRICAL MEASURING INSTRUMENT.
APPLICATION FILED SEPT. 10, 1915.

1,285,911.

Patented Nov. 26, 1918.
3 SHEETS—SHEET 1.

WITNESSES

INVENTOR
Clarence A. Boddie &
William M. Bradshaw

ATTORNEY

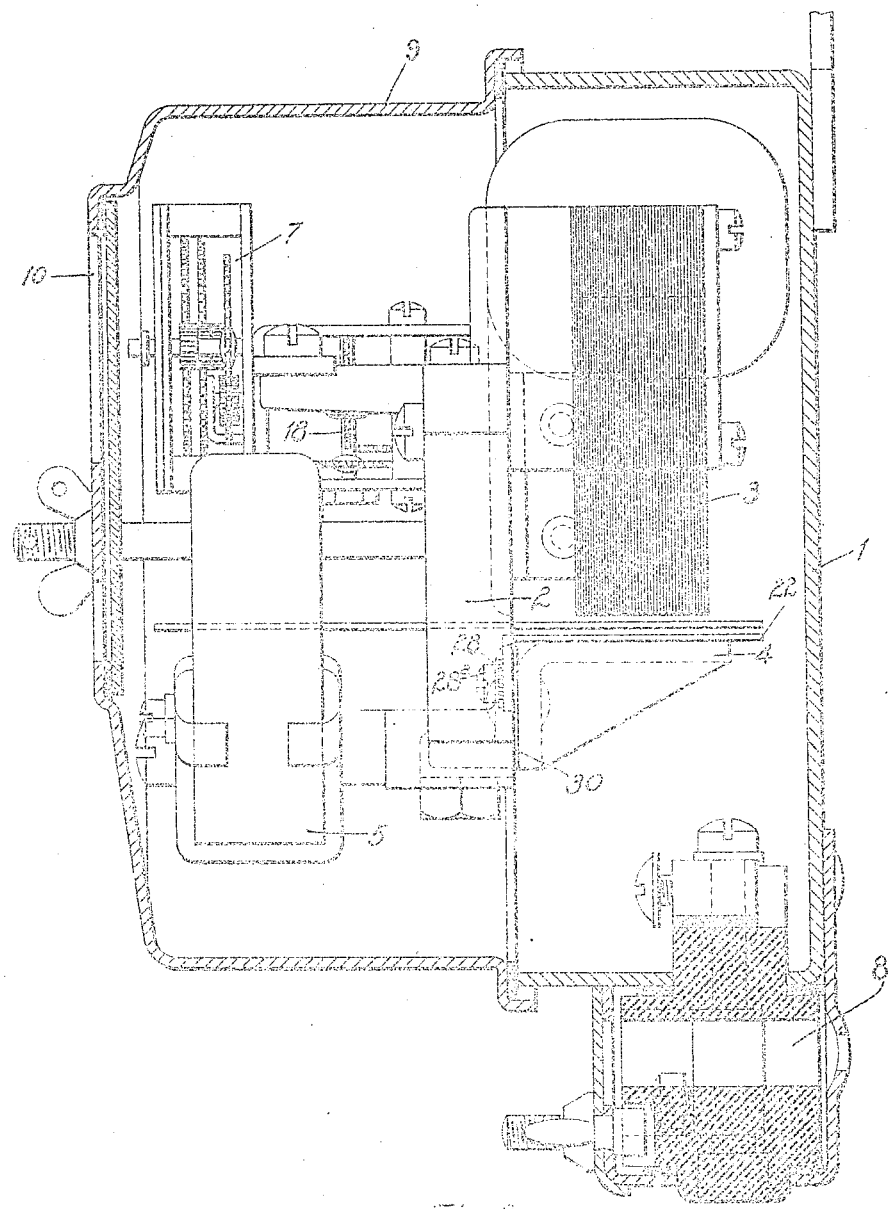

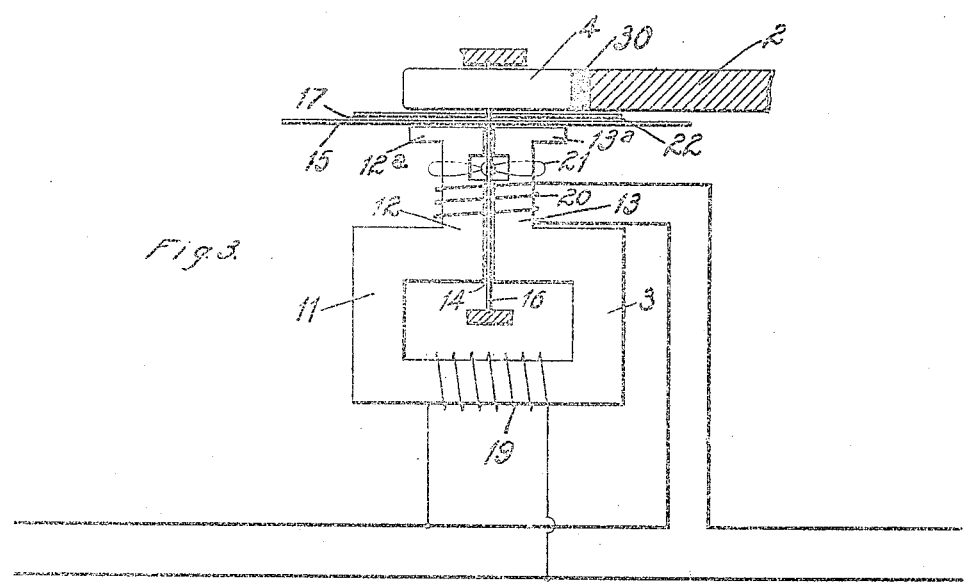
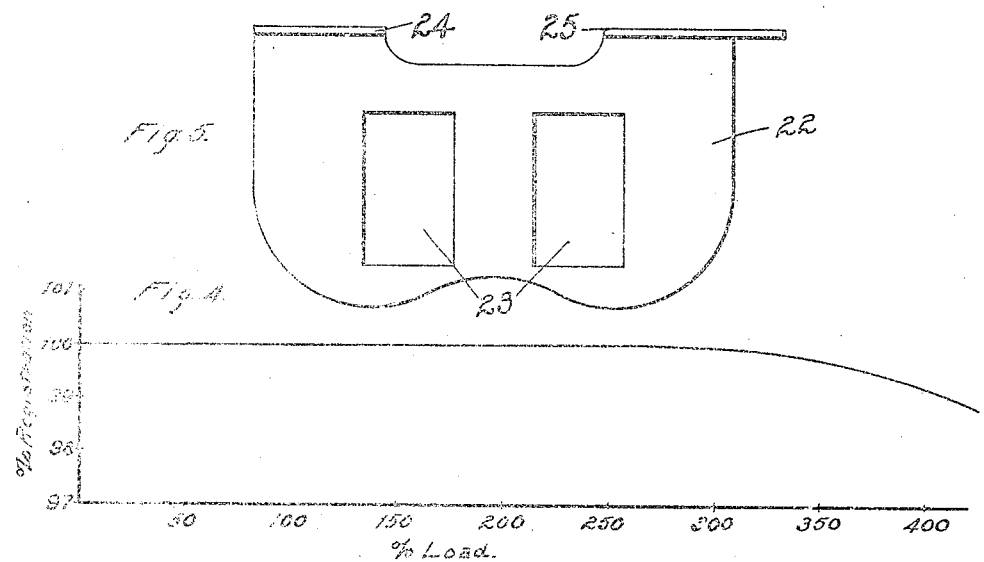

UNITED STATES PATENT OFFICE.

CLARENCE A. BODDIE, OF PITTSBURGH, AND WILLIAM M. BRADSHAW, OF WILKINSBURG, PENNSYLVANIA, ASSIGNORS TO WESTINGHOUSE ELECTRIC AND MANUFACTURING COMPANY, A CORPORATION OF PENNSYLVANIA.

ELECTRICAL MEASURING INSTRUMENT.

1,285,911.

Specification of Letters Patent. Patented Nov. 26, 1918.

Application filed September 10, 1915. Serial No. 50,103.

*To all whom it may concern:*

Be it known that we, CLARENCE A. BODDIE a citizen of the United States, and a resident of Pittsburgh, in the county of Allegheny and State of Pennsylvania, and WILLIAM M. BRADSHAW, a citizen of the United States, and a resident of Wilkinsburg, in the county of Allegheny and State of Pennsylvania, have invented a new and useful Improvement in Electrical Measuring Instruments, of which the following is a specification.

Our invention relates to electrical measuring instruments and particularly to motor meters.

The object of our invention is to provide an instrument of the above indicated character that is small in dimensions and economical to manufacture and that operates correctly on a wide range of load.

Heretofore, various methods have been proposed for straightening the load curves of alternating current watthour meters. One of these methods consists in increasing the torque of the meter at high loads so as to overcome the increased retarding effect of the current winding. In our present invention we provide means for decreasing the retarding effect of the current windings without affecting the torque of the meter and thus obtain a substantially straight load curve of constant value over a wide range.

We have discovered during the course of our experiments that in a wattmeter having two polar projections, upon which the current windings are wound, when the projections are located close together the retarding effect produced on the armature by the said current windings is greater than if the two polar projections are disposed a relatively great distance apart. We have, accordingly, made practical application of our discovery in the present meter in which a single polar projection for the series or current winding is provided, the retarding effect of the current winding being thereby reduced as well as the cost of manufacture.

In the accompanying drawings Figure 1 is a front elevational view of an electrical measuring instrument embodying our invention; Fig. 2 is a side view, partially in elevation and partially in section, of the instrument shown in Fig. 1; Fig. 3 is a diagrammatic view of an instrument embodying our invention; Fig. 4 is a diagram illustrating the per cent. registration curve for various loads traversing an instrument embodying our invention, and Fig. 5 is a detailed view of the light-load adjusting device of an instrument shown in Figs. 1 and 2.

A magnetic supporting member 2 is attached by screws $2^a$ to two brackets $2^b$ that are mounted on the inner walls of a meter casing 1.

The magnetic supporting member 2 has attached thereto a magnetizable core member 3, a magnetizable keeper 4, two permanent magnets 5 and 6 and an integrating mechanism 7. The casing 1 is provided with a terminal block 8 and with a cover 9 having an opening 10 therein for the purpose of observing the pointers (not shown) that are attached to the integrating mechanism 7.

The magnetizable core member 3 comprises a main body portion 11 and two polar projections 12 and 13. The polar projections 12 and 13 are substantially parallel and are separated by a single air gap 14. The pole faces $12^a$ and $13^a$ of the projections 12 and 13 are enlarged for the purpose of more uniformly distributing the magnetic flux. An armature 15 is mounted on a shaft 16 and is disposed in an air gap 17 between the magnetizable member 4 and the pole faces $12^a$ and $13^a$. The shaft 16 is operatively connected through a gear train 18 to the integrating mechanism 7. A potential winding 19 surrounds the main body portion 11 of the member 3 in such a manner that the polar projections 12 and 13 will be of opposite signs. A current winding 20 surrounds the polar projections 12 and 13 and spans the air gap 14, and causes the magnetic flux produced thereby in the polar projections 12 and 13 to be of the same sign. A figure eight short-circuited winding 21 surrounds the polar projections 12 and 13 and passes through the air gap 14, for the purpose of correcting the operation of the instrument for changes in power factor. A flat conducting member 22 is disposed in the air gap 17 for the purpose of adjusting the light load starting torque of the instrument.

The conductor 22 is provided with openings 23 and with two angular projections or ears 24 and 25 that are slotted for the reception of adjusting screws 26. The ear 25 is also provided with a toothed rack 27 that is engaged by a gear wheel 28 whereby the conductor 22 may be adjusted back and forth across the air gap 17. The gear wheel 28 is mounted on a pin 28ᵃ having a slot in its outer end to adapt it to be turned by a screw driver. The damping magnets 5 and 6 are secured to the supporting member 2 by clamping members 29.

It has been found that the best results are obtained when the member 4 is mounted on the magnetic supporting member 2 and magnetically separated therefrom by a non-magnetic member 30. Thus, a relatively high reluctance path is provided for the return of the magnetic flux produced by the winding 20 to the magnetizable core member 3.

Since the armature 15 is cut by magnetic lines of force that are produced by the current and the potential windings, and since these fluxes produce eddy currents in the armature 15, the armature is caused to rotate substantially in proportion to the product of the two fluxes. However, since the armature rotates between the poles of the permanent magnets 5 and 6 and between the polar projections 12, 13 and the member 4, it will be retarded a predetermined amount. As will be understood by those versed in the art, the polar projections 12 and 13 act as a single polar projection, with respect to the current winding and, hence, the retardation due to the action of the eddy currents in the armature and the flux produced by the current winding is substantially less than it would be if two polar projections were used, having opposite polarity. Hence, the retardation of the armature is such that at relatively great loads the registration curve is a straight line of substantially constant value.

While we have shown our invention in its preferred form, it will be understood that many modifications may be made therein without departing from the spirit and scope of the invention as set forth in the appended claims.

We claim as our invention:

1. An electrical measuring instrument comprising a magnetizable core member having two poles separated by a single air gap, a magnetizable member that is magnetically separated from the core member and disposed adjacent to the poles, a potential winding disposed on the core, a current winding disposed around the poles and the air gap, and an armature disposed adjacent the poles and in a plane substantially at right angles to the plane of the air gap.

2. An electrical measuring instrument comprising a magnetizable core member having two poles separated by a single air gap, a magnetizable member disposed adjacent the poles, a non-magnetic support for magnetically separating the magnetizable member from the core member, a current winding disposed around the poles and the air gap, and an armature disposed adjacent the poles and in a plane substantially at right angles to the plane of the air gap.

3. A motor-meter comprising a magnetizable core having two polar projections separated by a single air gap, a magnetizable member that is magnetically separated from the core member and disposed adjacent the polar projections, means for producing flux of the same sign at the two polar projections and an armature disposed between the polar projections and the magnetizable member in a plane at right angles to the plane of the air gap.

4. A motor comprising a magnetizable core member having two substantially parallel poles separated by a single air gap, an armature disposed adjacent the poles, a potential winding disposed on the core, a current winding so disposed around both of the poles as to produce magnetic lines of flux of the same sign therein, and a magnetizable member disposed adjacent the poles and magnetically separated from the core member.

5. An electrical measuring instrument comprising a magnetizable core member having two substantially parallel poles separated by a relatively small air gap, a magnetizable member that is magnetically separated from the core member and disposed adjacent the poles, a disk armature disposed between the poles and the magnetizable member, a potential winding disposed on the core member and adapted to produce magnetic lines of flux of opposite sign in the poles, and a current winding that produces magnetic lines of flux of the same sign in the poles, said magnetically separated member being adapted to decrease the retardation of the armature.

6. A motor comprising a magnetizable core member having two poles separated by a single air gap, a magnetizable member that is magnetically separated from the core member and that is disposed adjacent the ends of the poles, an armature disposed between the poles and the magnetizable member, a potential winding adapted to produce magnetic flux of opposite sign in the poles, and a current winding adapted to produce magnetic flux of the same sign in the poles.

In testimony whereof we have hereunto subscribed our names this 8th day of Sept., 1915.

CLARENCE A. BODDIE.
WILLIAM M. BRADSHAW.